Jan. 24, 1950  F. G. COSTELLO  2,495,409
NUT FOR LEAD SCREWS
Filed Jan. 19, 1945  2 Sheets-Sheet 1
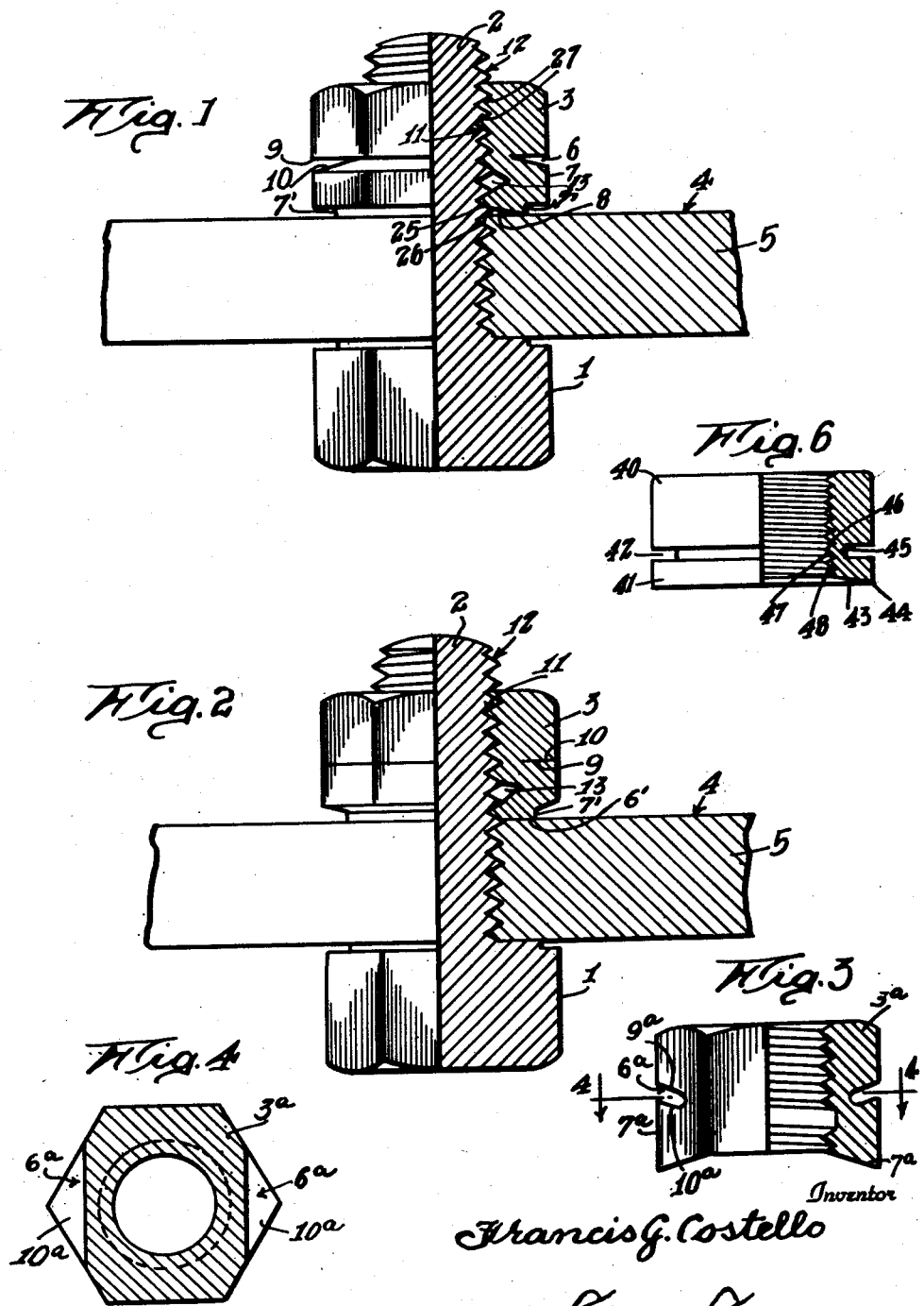
Inventor
Francis G. Costello
By Lyon & Lyon
Attorneys Jan. 24, 1950 F. G. COSTELLO 2,495,409
NUT FOR LEAD SCREWS Filed Jan. 19, 1945 2 Sheets-Sheet 2

Inventor
Francis G. Costello

By Lyon & Lyon
Attorneys

Patented Jan. 24, 1950

2,495,409

UNITED STATES PATENT OFFICE 2,495,409

NUT FOR LEAD SCREWS

Francis G. Costello, Los Angeles, Calif.

Application January 19, 1945, Serial No. 573,549

4 Claims. (Cl. 287—52.07)

This invention relates to lock nuts, and more particularly to the construction of a nut or threaded element which, when threaded into position against an abutment, will lock itself in position.

Many forms of lock nuts have been suggested which operate upon the principle of increase in the resistance between the threads upon an unthreading operation.

It is an object of this invention to provide a lock nut or threaded element which is adapted to be threaded into position and which includes a section which is relatively movable with reference to the main section of the said nut or threaded element and which threaded element is adapted to be stopped or engaged against a surface upon which stopping it is relatively moved with reference to the remainder of the nut to produce a binding throughout the threads of the nut or threaded element to thereby prevent backing off of the nut element from the said threads.

Another object of this invention is to produce a lock nut construction which comprises a threaded element weakened at a point between the threads so as to be relatively movable with relation to the remainder of the nut structure and which is so constructed as to apply a clamping force between the threads of the lock nut and the member upon which it is threaded.

Another object of this invention is to provide a new and improved backlash eliminator for a cooperating lead screw and nut.

Other objects and advantages of this invention it is believed will be apparent from the following detailed description in the several forms which my invention may take as shown in the accompanying drawings.

In the drawings:

Figure 1 is a side elevation in mid-section of the lock nut construction embodying my invention illustrating the same as threaded on a bolt member prior to the locking operation.

Figure 2 is a drawing similar to Figure 1 illustrating the lock nut threaded against the plate element and locked in position against backing off from the bolt.

Figure 3 is a sectional elevation of a modified form of lock nut embodying my invention.

Figure 4 is a sectional view taken substantially on the line 4—4 of Figure 3.

Figure 6 is an elevation half in mid-section of a modified form of structure embodying my invention.

Figure 5:
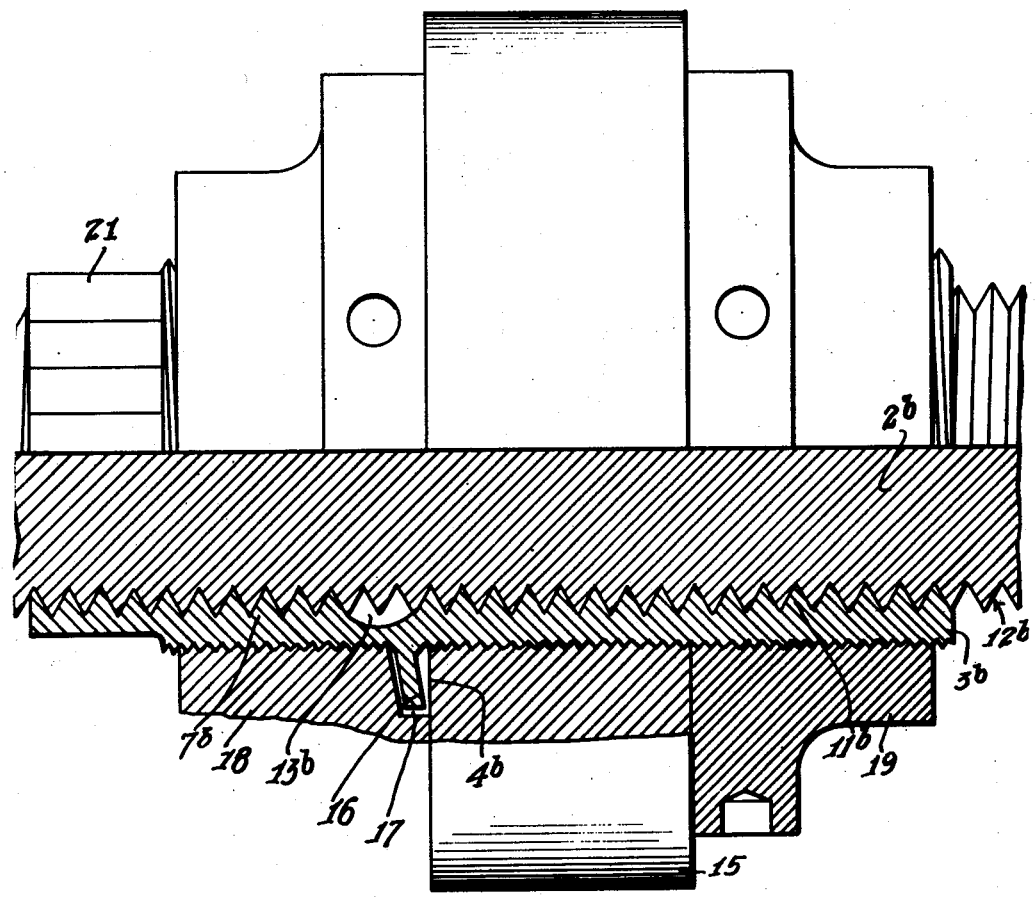
Figure 5 is an elevation in mid-section of a further modified form of structure embodying my invention.

In the preferred embodiment of my invention as illustrated in the drawings, I indicates a bolt or threaded element having a threaded shank or section 2 upon which a lock nut 3 is threaded to engage the surface 4 of a plate element 5. In this modification of my invention the lock nut 3 is formed as an ordinary hex nut which is cut away or grooved as indicated at 6 between its ends to provide a beam section 7. The lower surface 8 of the beam section is cut away or beveled at an angle to the surface 4 against which it will engage as the nut 3 is threaded upon the threaded shank 2. As herein illustrated, the cut-away 6 has a flat surface 9 and a tapered surface 10 cut into the metal of the nut 3 a material distance so that the lock section 7 is readily removable with relation to the remainder of the body of the nut 3.

On the interior the lock section 7 of the nut 3 is grooved as indicated at 13, the result being the removal of one of the threads circumferentially of the inner surface of the nut 3.

As illustrated in Figure 2, the clamping section of the nut 3 moves with relation to the body of the nut 3 when the nut is threaded upon the shank 2 to force the lock section against the surface 4. In carrying out this operation, the circumferential edge 7' of the lock section 7 engages the surface 4 and forms a fulcrum 6' around which the lock section 7 is deformed as the nut 3 is threaded upon the shank 2. The distortion of the lock section 7 around the circumferential edge 7' brings the conical surface 8 into coincidence with the plane surface 4. This twisting of the lock section 7 with respect to the upper portion of the nut 3 serves to spread the set of threads in the lock portion with respect to those in the main portion 3, and thus effect a clamping action. The elasticity of the metal of which the nut is formed establishes the limit of the pressure which may be exerted against the surface 26, thereby permitting a great force to be applied to prevent backing of the nut 3 off from the shank 2. As the locking section 7 thus acts through the thread 25 to put a compressive force against the surface 26, there is a corresponding reaction in the threads of the body of the nut 3 tending to cause the threads of that section to be compressed against the opposite faces 27 of the threads of the shank 2 upon which the body section of the nut is threaded. The spreading action of the different sections of the threads of the nut are thereby in engagement under compression throughout their surfaces with the threads of the shank 2 with the result that the nut is firmly locked to the shank and will not back off. The locking section 7 fulcrums around the point 7' until the surfaces 9 and 10 are brought into engagement which gives to the operator a visible indication that the nut is threaded to its limit upon the shank 2 and that further attempt to thread the nut upon the shank will not produce any greater locking effect but will only tend toward stripping the threads of either the nut 3 or the shank 2.

The bringing of the nut 3 home to locked position is accomplished without extended force and the tendency to strip the threads 12 from the shank 2 or the threads 11 from the nut 3 is reduced due to the fact that the clamping force as exerted between the threads is at an angle to the axis of the shank 2 or nut 3 because of the bending of the lock section 7.

In the modification of my invention illustrated in Figure 3, the lock nut 3a is similar in all respects to that illustrated in Figures 1 and 2 with the exception that the groove 6a is milled, or otherwise cut, into the surface of the nut to provide two parallel faces 9a and 10a, the cutting of the groove 6a being forced at an angle to the plane outer surface of the nut. In this way the movement of the lock section 7a continues upon the threading of the nut 3a upon the threaded member until this groove 6a is closed only at its outer section, that is, the surfaces 9a and 10a are not brought into contact except at the outer edge of the groove 6a.

In the modification of the invention as illustrated in Figure 5, I have shown the principle of my invention adapted to a device for locking a threaded sleeve in position upon a lead screw 2b of a metal cutting or milling machine where the stationary element 15 is positioned relative to the screw 2b in a definite position longitudinally of the screw and must be held thereon rigidly against any lateral movement or backlash. In this type of construction the lock nut 3b is illustrated as a sleeve which is threaded upon the threads 12b of the screw 2b and is provided with an annular flange 16 which fits within a cut-out recess 17 of the lock collar 18. Immediately adjacent the flange 16 one or more of the threads 11b of the lock nut 3b are cut away to form a groove 13b. In this type of construction a stop collar 19 is threaded upon the sleeve 3b to form an end stop for the element 15. The stop collar 18 is threaded upon the sleeve 3b on the opposite face of the element 15. The lock nut 3b is provided with a wrench surface 21 beyond the collar 18 upon which a suitable wrench may be applied for threading the lock nut 3b upon the screw 2b whereby the annular flange 16 which is inclined from a true normal to the axis of the said lock nut may be forced against the engaging surface 4b of the element 15. In this modification the locking action is effected due to relative elongation of the lock section 7b with relation to the remainder of the lock sleeve or nut 3b. When the flange 16 engages the surface 4b and as the sleeve 3b is rotated, the relative elongation occurs with the result that the threads on one side of the weakening groove 13b lag behind the threads of the remainder of the lock nut 3b. This relative elongation of the two sections of the lock nut 3b results in reducing the backlash between the threads of the locknut and the threads of the screw 2b.

The principle illustrated in Figure 5 is adapted to milling machines, jig borers, micrometer and other instruments requiring precision measurement graduated to .001 of an inch, using a threaded screw as a medium for computing distances. The principal advantage of the modified form illustrated in Figure 5 is to eliminate backlash between the sleeve 3b and the screw 2b.

The required amount of turning of a suitable wrench applied to surface 21 from time to time would compensate for wear on threads 12b of screw 2b and wear of threads 11b of sleeve 3b and remove backlash on screw 2b to allow accurate reading of the graduations on the disc on the end of screw 2b to .001 of an inch. The lock collars 18 and 19 hold sleeve 3b in fixed position.

In Figure 6 I have illustrated a further modification of my invention in which the nut 40 has a lock section 41 separated from the body of the lock by an annular groove 42. The end-engaging surface of the nut 40 is tapered inwardly as indicated at 43 to provide an annular fulcrum rim 44 similar to the engaging rim 7' in the modification of my invention of Figures 1 and 2. In this modification I have not relieved the threads from the interior of the nut 40 so that the limit locking force which may be applied in this structure is the elastic limit of the relieved section 45 of the nut 40 which lies at the inner end of the groove or recess 42. In this modification a locking force is applied by threading the nut 40 on a threaded member until the rim 44 engages a lock surface. Continued threading of the nut 40 upon the said threads results in a swinging action of the lock section 43 around the rim 44 as it is engaged with the lock surface 4 and the threads 47 and 48 in the locked section 43 are spread away from the threads 46 in the upper portion of the nut 40. The spreading occurs in the metal of the lock nut lying radially within the groove 42 and identified as the weakened section 45. As in the first modification of my invention, the locking is effected by relative separation of the threads of the nut. This structure of nut is particularly adaptable for light duty or small size nuts where there will remain a sufficient portion of metal at the weakened section 45 to permit of the application of the desired locking pressure between the threads. In larger size nuts I prefer to employ the structure of the form illustrated in Figures 1 and 2 where a thread or threads are removed from the interior of the nut permitting a greater freedom of fulcrum of the lock section with relation to the body of the nut.

Having fully described my invention, it is to be understood that I do not wish to be limited to the details herein set forth, but my invention is of the full scope of the appended claims.

I claim:

1. In a device of the class described, the combination of a stationary supporting collar, a rotary lead screw extending through the collar, a lock sleeve having internal threads adapted to cooperate with said lead screw, an internal annular weakening groove in the lock sleeve, external threads on the lock sleeve for engagement with said stationary collar, a pair of nuts longitudinally spaced on said lock sleeve and cooperating with said external threads to clamp said collar therebetween, a laterally extending flange on said lock sleeve near said internal groove and adapted to engage a side face on said stationary collar, and means whereby the lock sleeve may be turned relative to the stationary collar.

2. In a device for eliminating backlash between a lead screw and its cooperating nut member the combination of a stationary supporting collar encircling a portion of the nut member, interengaging thread means on the stationary collar and the nut member, the nut member having an annular weakening groove formed therein between its ends, a radially extending flange on the nut member near said weakening groove and adapted to engage a portion of said stationary collar, means including a lock element for securing the nut member in position relative to said stationary collar, and wrench flats on the nut member whereby it may be turned relative to the stationary collar to bring said flange into engagement with said collar.

3. In a device for eliminating backlash between a lead screw and its cooperating nut member, the combination of a stationary supporting collar encircling the nut member, interengaging thread means on the stationary collar and the nut member, an annular weakening groove formed in the interior of said nut member between the ends thereof, a laterally extending flange on said nut member near said groove and adapted to engage a side face on said stationary collar, means including a lock element for securing the nut member in position relative to said stationary collar, and means whereby the nut member may be turned relative to the stationary collar.

4. In a device for eliminating backlash between an externally threaded element and a cooperating internally threaded element, the combination of a stationary supporting collar encircling both of said elements and provided with an internal thread, an external thread on the internally threaded element engaging the internal thread formed in said collar, a flange on the internally threaded element, means including a lock element for securing said internally threaded element in threaded position relative to the said collar, an annular internal weakening groove formed in the interior of said internally threaded element between the ends thereof, means for distorting the internal threads on one side of said groove with respect to the threads on the other side of said groove, said means including a side face on the stationary collar adapted to be engaged by said flange on the internally threaded element, and means whereby the said internally threaded element may be turned relative to the collar.

FRANCIS GEO. COSTELLO.

REFERENCES CITED

The following references are of record in the file of this patent:

UNITED STATES PATENTS

| Number | Name | Date |
|---|---|---|
| 208,965 | Crowell | Oct. 15, 1878 |
| 872,883 | Adams | Dec. 3, 1907 |
| 874,267 | Wagner | Dec. 17, 1907 |
| 1,406,065 | Norwood | Feb. 7, 1922 |
| 1,885,459 | McDonnell | Nov. 1, 1932 |
| 2,196,637 | Luce | Apr. 9, 1940 |
| 2,215,560 | Oddie | Sept. 24, 1940 |
| 2,286,895 | Carlson | June 16, 1942 |

FOREIGN PATENTS

| Number | Country | Date |
|---|---|---|
| 7,767 | Great Britain | 1903 |
| 188,267 | Great Britain | Nov. 9, 1922 |
| 249,179 | Great Britain | Mar. 19, 1926 |
| 375,430 | Great Britain | June 30, 1932 |